United States Patent [19]
Schmidt et al.
[11] Patent Number: 4,588,643
[45] Date of Patent: May 13, 1986

[54] PERFLUOROCARBON POLYMERIC COATINGS HAVING LOW CRITICAL SURFACE TENSIONS

[75] Inventors: Donald L. Schmidt, Midland, Mich.; Louis W. Meyer, Lake Jackson, Tex.; Demetrius Urchick, Midland, Mich.

[73] Assignee: The Dow Chemical Company, Midland, Mich.

[21] Appl. No.: 476,661

[22] Filed: Mar. 18, 1983

[51] Int. Cl.[4] .......................... B32B 27/00; B05D 7/22

[52] U.S. Cl. .................................... 428/422; 428/421; 428/461; 428/412; 428/576; 428/423.1; 428/543; 524/165; 427/230; 427/234; 427/235

[58] Field of Search ........................ 428/421, 422, 461; 427/230, 234, 235

[56] References Cited

U.S. PATENT DOCUMENTS

| | | | |
|---|---|---|---|
| 3,033,833 | 5/1962 | LeFevre et al. | 524/166 X |
| 3,692,673 | 9/1972 | Hoke | 526/287 X |
| 3,773,544 | 11/1973 | Newton et al. | 428/421 X |
| 4,075,134 | 2/1978 | Morehouse, Jr. et al. | 529/156 X |
| 4,140,834 | 2/1979 | Marcantomo et al. | 428/421 X |
| 4,344,993 | 8/1982 | Schmidt et al. | 428/35 |
| 4,393,119 | 7/1983 | Concannon | 428/421 X |

*Primary Examiner*—P. C. Ives

[57] ABSTRACT

Coated internal surfaces of molding apparatus and a process for reducing the amount of sticking of material on the internal surface of a molding apparatus are disclosed. The coated substrate and the process both employ release compositions having very low surface tensions comprising (1) a linear or branched polymer containing ionic functional moieties and (2) a perfluorocarbon compound having a counterionic character. Such compositions dissolve in volatile acidic or basic solutions and result in salt precipitates which adhere to substrates upon the evaporation of the volatile acidic or basic solution.

2 Claims, No Drawings

PERFLUOROCARBON POLYMERIC COATINGS HAVING LOW CRITICAL SURFACE TENSIONS

BACKGROUND OF THE INVENTION

This invention relates to release coatings containing perfluorocarbon release agents and to processes for using such coatings as mold release agents.

A wide variety of molding applications require molding apparatus with surfaces which will easily release molded articles and molding materials. Polymer deposits on molding apparatus surfaces resulting from the "sticking" occurring during molding processes not only make it more difficult and time consuming to remove molded parts from said molds, but such deposits have a tendency to deteriorate and fragment, thus decreasing the quality of the surfaces of products molded therefrom.

One approach directed towards obtaining surfaces which readily release adhesives has involved the application of various hydrocarbon and silicone oils, and waxes to the surfaces of molds which are exposed to said polymer compositions. Commonly, hydrocarbon and silicone oils and waxes are sprayed or wiped onto injection molding apparatus, which is then used for the molding of polymers and prepolymers. Unfortunately, it is generally the case that only one to about three injection cycles may be performed before it is necessary to retreat the mold with said nonstick agents.

Another approach for providing molding apparatus surfaces which have good release characteristics is the application of fluorinated polymers, such as tetrafluoroethylene. These types of polymers are applied to a surface either as an oil, small solid particles or as a coating. Unfortunately, these types of polymers are typically bound to surfaces with nonfluorinated binders or by a difficult process involving sintering of the polymer particles at high temperatures.

Perfluorinated polymers are believed to release because they produce a very low critical surface tension of wetting ($\gamma_c$) More recently, as disclosed in U.S. Pat. No. 4,344,993, a combination of a hydrophilic polymer with up to about 0.5 weight percent perfluorocarbon and crosslinked with a cyclic sulfonium zwitterion yields a surface coating having a surface tension of wetting of less than that of coatings consisting of 100 percent perfluorocarbon. Although this type of coating is useful for preventing deposits of polymerization reactants and products from adhering to reactor surfaces in the production of olefinic polymers, such a coating does not adhere adequately to surfaces of conventional molding apparatus when amounts of perfluorocarbon greater than 0.5 weight percent are employed. In addition, such a coating does not adequately release adherent polymers such as polyurethanes which are produced in reaction injection molding (RIM) processes.

Therefore, it is highly desirable to provide an improved coating which adheres well to a molding apparatus surface, and a process for using same which will significantly reduce the undesirable deposition of material and sticking on internal surfaces of molding apparatus by providing a low $\gamma_c$.

SUMMARY OF THE INVENTION

The present invention is an adherent coating composition which comprises the salt of (1) a linear or branched polymer containing a proportion of ionic functional moieties (hereinafter called an "ionic polymer") and (2) a proportion of a perfluorocarbon compound having a $-CF_3$ group and a counterionic character (hereinafter called a "counterionic perfluorocarbon"). By the terms "ionic" and "counterionic" is meant that the coating composition comprises a polymer containing cationic moieties and an anionic perfluorocarbon and vice versa.

The coating compositions dissolve in volatile basic or acidic solutions to form formulations which are applied to molding apparatus surfaces and yield polymer/perfluorocarbon salts which act as mold release agents as the volatile basic or acidic solution evaporates. The amount of ionic polymer and counterionic perfluorocarbon and the proportion of ionic and counterionic moieties is such that the resulting coating has a critical surface tension of wetting of less than about 15 dynes per centimeter (dynes/cm). The proportion of the ionic functional moieties per polymer molecule is approximately equal to the proportion of counterionic functional moieties per perfluorocarbon. By "proportion" is meant the number of equivalents of each of the ionic and counterionic moieties, respectively. Surprisingly, the combination of polymer and perfluorocarbon in the coating composition of the present invention provides a surface having a critical surface tension less than that of a coating consisting entirely of a linear perfluorocarbon, such as a homopolymer of tetrafluoroethylene.

In another aspect, this invention is a coated substrate wherein said polymer and perfluorocarbon compounds are contacted in the presence of a volatile acidic or basic solution, applied to the substrate, and the volatile acidic or basic solution is allowed to evaporate. The coating compositions are particularly useful in reducing the amount of sticking of material on the internal surfaces of the molding apparatus. Accordingly, in another aspect, this invention is such a process for reducing the sticking of material to internal surfaces of molding apparatus which comprises applying the aforementioned coating to the internal surfaces of molding apparatus. Such a process is advantageously employed in the molding of aliphatic $\alpha$-olefin polymers such as polyethylenes, polypropylenes, polycarbonates, polyurethanes, and the like.

DETAILED DESCRIPTION OF THE INVENTION

Ionic polymers suitably employed in the practice of this invention are those (1) which can be cast as an adherent coating on a substrate and (2) which contain a proportion of ionic functional moieties sufficient such that said polymer is soluble in a suitable solvent when in the presence of a volatile basic or acidic species. The polymers of this invention are most advantageously copolymers of ethylenically unsaturated monomers containing ionic functionalities and ethylenically unsaturated essentially nonionic monomers. The amount of nonionic monomer can vary from 0 to about 90 weight percent and the amount of monomer containing the ionic functionalities can vary from about 10–100 weight percent. It is understood that the amount of each of the respective types of monomers can vary depending upon the ionic character of the ionic functionality. Polymers of this invention are prepared using standard procedures described in U.S. Pat. No. 3,033,833, which is incorporated herein by reference. Although not particularly critical, the molecular weight of said polymers typically vary from about 5,000 to about 3 million.

Examples of anionic polymers are most advantageously represented by the formula:

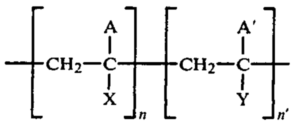

wherein A and A' are individually hydrogen, chloro, or lower hydrocarbyl, most preferably hydrogen or methyl. X is a pendant group containing an anionic moiety. Y is a pendant group containing an essentially nonionic moiety, and n and n' are individually positive integers.

Examples of Y include hydrogen, chloro, R', $-CONH_2$, $-CONHR'$, $-COOR'$, $-COArR''$, $-COO(C_2R_4O)_mR''$, $-ArR''$ and $-ArR'''$, wherein Ar and R are as previously defined. R' is hydrocarbyl containing from about 1 to about 20 carbon atoms; R'' is R' or hydrogen; R''' is halo (halo is chloro or bromo), hydroxyl, or halo or hydroxyl substituted lower alkyl (i.e., from 1 to about 4 carbon atoms); and m is an integer from 1 to about 20.

Suitable anionic functional moieties include functional groups such as carboxylic acids, sulfonic acids, sulfinic acids, and the sulfosuccinates, with the carboxylic and sulfonic acids being preferred. Thus, X can include, for example, $-COOH$, $-SO_2OH$, $-COOX'$, $-CONHX'$ and ArX', wherein Ar is aryl and X' is selected from a member of the group consisting of $-(CR_2)-SO_2OH$ and $-(CR_2)_m-COOH$, wherein R is hydrogen or lower alkyl containing from about 1 to about 3 carbon atoms, most preferably hydrogen or any combination thereof, and m is an integer from 1 to about 40.

Specific examples of suitable ethylenically unsaturated monomers containing anionic moieties include N-sulfoalkyl, α,β-ethylenically unsaturated amides such as 2-acrylamide-2-methylpropane sulfonic acid, 2-acrylamide propane sulfonic acid, and 2-acrylamido ethane sulfonic acid as well as other such monomers listed in U.S. Pat. No. 3,692,673 which is hereby incorporated by reference; sulfoalkyl esters of unsaturated carboxylic acids such as 2-sulfoethyl methacrylate and other such sulfoalkyl esters as listed in U.S. Pat. No. 4,075,134 which is also incorporated by reference; sulfoarylalkenes such as vinylbenzyl sulfonic acid, p-styrene sulfonic acid, sulfoalkenes such as vinyl sulfonic acid and the like. Of the foregoing sulfonate monomers, the sulfoalkyl derivatives of acrylamide and methacrylamide are preferred with those of acrylamide being especially preferred, particularly 2-acrylamido-2-methylpropane sulfonic acid (AMPS), and 2-acrylamido-2-propane sulfonic acid.

Examples of cationic polymers are most advantageously represented by the formula:

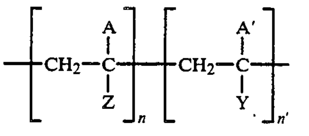

wherein A, A', n, n' and Y are as previously defined, and Z is a pendant group containing a cationic moiety.

Suitable cationic functional moieties include the hydroxide, carbonate or bicarbonate salts of aliphatic quaternary ammonium, phosphonium and pyridinium moieties, with the hydroxide salts of the aliphatic quaternary ammonium moieties being most preferred. Thus, Z can include for example, $-CONH(CR_2)_m-N^+(R')_3An^-$, $-COO(CR_2)_m-N^+(R')_3An^-$, $-Ar-(CR_2)_m-N^+(R')_3An^-$, $-SO_2N(CR_2)_m-N^+(R')_3An^-$, $-(CR_2)_m-N^+(R')_3An^-$, $-(CR_2)_mP^+(R')_4An^-$, $-ArS^+(R')_2An^-$, $-P^+(R)_3An^-$ wherein Ar, R and R' are as previously defined, m is an integer from 0 to about 20, and $An^-$ is an anion such as hydroxide, formate, acetate, trifluoroacetate, monofluoroacetate, carbonate or bicarbonate, most preferably hydroxide. Cationic functional moieties can also include the primary, secondary and tertiary amines, ethoxylated amines, amido amines, imidazolines and oxazolines. Moreover, when such amines are employed as a function on either the polymer or perfluorocarbon, only the volatile acid can be employed.

Specific examples of especially preferred ethylenically unsaturated monomers containing cationic moieties which are given for purposes of illustration include 2-aminoethyl methacrylate hydrochloride, 2-(N,N-dimethyl)aminoethyl methacrylate hydrochloride, 2-aminoethyl acrylate, N-(N',N'-dimethyl)aminomethylacrylamide, N-(N',N'-dimethyl)-2-aminoethyl methacrylamide, N-(N',N'-dimethyl)-2-aminoethyl acrylamide, N-(N',N'-dimethyl)-3-aminopropyl methacrylamide, N-(N',N'-dimethyl)-aminopropyl maleimide, vinyl amine, vinyl benzyl amine, vinyl pyridine, vinyl pyrrolidine, and other weakly basic monomers having pKa values between about 4 and about 11.

Ionic perfluorocarbons suitably employed in the practice of this invention include organic compounds represented by the formula:

$R_fZ$ wherein $R_f$ is a saturated fluoroaliphatic moiety containing a $F_3C$- moiety and Z is an ionic moiety or potentially ionic moiety. Suitable anionic and cationic moieties have been previously described. The fluoroaliphatic moiety advantageously contains from about 3 to about 20 carbons wherein substantially all are fully fluorinated, preferably from about 3 to about 10 of such carbons. This fluoroaliphatic moiety may be linear, branched or cyclic, preferably linear, and may contain an occasional carbon-bonded hydrogen or halogen other than fluorine, and may contain an oxygen atom or a trivalent nitrogen atom bonded only to carbon atoms in the skeletal chain. More preferably are those linear perfluoroaliphatic moieties represented by the formula: $C_nF_{2n}+1$ wherein n is in the range of about 5 to about 10. Most preferred are those linear perfluoroaliphatic moieties represented in the paragraphs below.

When polymers containing anionic functionalities are employed, the counterionic perfluorocarbon is a cationic perfluorocarbon and is preferably selected from a member of the group consisting of $CF_3(CF_2)_rSO_2NH(CH_2)_sN^+R''_3\bar{An}$ and $CF_3(CH_2)_rCONH(CH_2)_sN^+R''_3\bar{An}$; wherein $\bar{An}$ is carbonate, bicarbonate, hydroxide, or other anions as previously defined, R" is lower alkyl containing between 1 and about 4 carbon atoms, r is about 2 to about 15, preferably about 2 to about 6, and s is about 2 to about 5. Especially preferred cationic perfluorocarbons are a 3-[((heptadecylfluorooctyl)sulfonyl)amino]-N,N,N-trimethyl-1-propanaminium salt; a 3-[((heptadecylfluorooctyl)carbonyl)amino]-N,N,N,-trimethyl-1-propanaminium salt, a cationic perfluorocarbon sold by DuPont under the trade name Zonyl® FSB, and a perfluorocarbon sold under the trade name Fluorad® FC 134 by the 3M Corporation. Examples of other preferred cationic perfluorocarbons, as well as methods of preparation, are those listed in U.S. Pat. No. 3,775,126. It is understood that the hydroxides, carbonates or bicarbonates of said cationic perfluorocarbons may be prepared by passing the cationic perfluorocarbon through, for example, a desired ion exchange resin.

When polymers containing cationic functionalities are employed, the counterionic perfluorocarbon is an anionic perfluorocarbon and is preferably selected from a member of the group consisting of $CF_3(CF_2)_pSO_2OH$, $CF_3(CF_2)_pCOOH$, $CF_3(CF_2)_pSO_2NH(CH_2)_qSO_2OH$ and $CF_3(CF_2)_pSO_2NH(CH_2)_qCOOH$; wherein p is from about 2 to about 15, preferably about 2 to about 6, and q is from about 2 to about 4. Especially preferred anionic perfluorocarbons are perfluorooctanoic acid, perfluorooctyl sulfonic acid, an anionic perfluorocarbon or an amphoteric perfluorocarbon sold by DuPont under the trade name Zonyl® FSA or Zonyl® FSP; or a perfluorocarbon sold under the trade name Fluorad® FC 129 or Fluorad® FC 120 by the 3M Corporation. Examples of other preferred anionic perfluorocarbons, as well as methods of preparation, are illustrated in U.S. Pat. No. 3,172,910.

Examples of volatile basic species (i.e., volatile base) include aqueous ammonia and volatile amines, such as mono-, di- and trimethyl amines, and ethyleneamines. By the term "volatile acid" is meant one which has a relatively low vapor pressure as, for example, acetic acid. By the term "suitable solvent" is meant a liquid that acts as a solvent for each of the ionic polymer and counterionic perfluorocarbon components. Examples include water, alkanols such as ethanol, propanols, butanols, tetrahydrofuran, dimethylsulfoxide, ketones, polyols, such as the DOWANOL* glycol ether products sold by The Dow Chemical Company, ethylene glycol, and mixtures thereof.

* Trademark of The Dow Chemical Company

In the preparation of the release coating compositions of the present invention, the polymer containing the ionic functional moieties and the counter-ionic perfluorocarbon compound are formulated in approximately a 1:1 equivalent ratio in a suitable solvent containing a volatile basic species. The volatile basic species is necessary in order to prevent the ionic moieties of the polymer from reacting with the counterionic perfluorocarbon and precipitating out of solution. Typically, the pH of the solution is in the range from about 8 to about 12, most preferably from about 9 to about 11. The preferred compositions contain from about 5 to about 90, most preferably from about 10 to about 80, weight percent counterionic perfluorocarbon and about 12 to about 95, most preferably from about 20 to about 90, weight percent ionic polymer.

Alternatively, release coating compositions are prepared by formulating the polymer containing the ionic functional moieties and the counterionic perfluorocarbon compound in approximately a 1:1 equivalent ratio in a suitable solvent containing a volatile acidic species. Typically, the pH of the solution is in the range from about 2 to about 6.

The formulations of the present invention preferably contain from about 1 to about 20, most preferably from about 2 to about 5, weight percent of the coating composition (i.e., total weight of ionic polymer and counterionic perfluorocarbon), and from about 80 to about 99, preferably from about 95 to about 98, weight percent acidic or basic solution.

Accordingly, the coating may be applied directly (i.e., without the prior application of a primer coating) to the interior surfaces of the molding apparatus in a convenient manner, such as wiping, spraying, brushing on, and the like. Brushing has been found to be satisfactory since it ensures complete coverage of all surfaces. Any uncovered areas, such as pinholes, etc., should be avoided since such exposed areas provide sticking sites for polymer build-up. It is most desirable that one layer of coating be applied. The amount of coating applied for the thickness thereof is not particularly critical so long as a continuous film over all interior surfaces of the molding apparatus is provided. In some instances, it may be preferable to pretreat the internal surfaces of the reaction vessel with conventional chemical coupling agents. For example, prehydrolyzed silane coupling agents such as

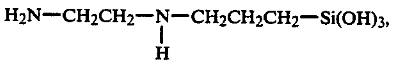,

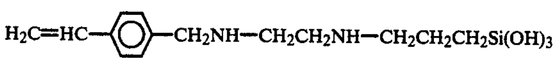

and the like are particularly useful for this purpose.

When said formulations are applied to the surface of a molding apparatus, the volatile basic or acidic solution evaporates converting the formulation to an ionic polymer/counterionic perfluorocarbon salt that (1) is inert to any polymeric reagents which will contact the coating in subsequent use, (2) has a $\gamma_c$ of less than about 15 dynes/cm, and (3) can be removed by a basic or acidic solution.

Following the application of the coating of the interior surfaces of the mold, including product transfer conduits, etc., the coating may be heated in order to dry and cure the same. Any suitable heating method may be employed, such as radiant heating, heated air, and the like. Usually, temperatures within the range of 90° to about 160° C. are sufficient; with temperatures in the range of 110° to 130° C. being preferred. The temperature chosen will depend upon the time of drying. Thereafter, the molding to be carried out in the equipment may be commenced immediately. No particular modifications of processing techniques are required due to the presence of the coating. Further, utilization of the internally coated mold of the present invention does not adversely affect the heat stability or other physical and chemical properties of the polymers or other molded products produced therein. Ordinary care should, of course, be exercised to avoid abrading or rupturing the coating.

The following examples are illustrative embodiments of this invention and should not be construed as limiting its scope. Unless otherwise indicated, all parts and percentages are by weight.

EXAMPLE 1—COATING FORMULATION

A coating formulation is prepared by mixing 1 ml of 0.185 meq/g aqueous solution of an anionic copolymer of 59 weight percent of 2-sulfoethyl methacrylate and 41 weight percent of n-butyl methacrylate, said copolymer having a number average molecular weight of about 5,000. The solution is made basic to a pH of about 9 with aqueous ammonia. One gram of this material is slowly added, with stirring, to 37 g of a 0.0050 meq/g solution of a cationic perfluorocarbon, FC 134, sold commercially by the 3M Corporation, which has been pretreated with an anion exchange resin, DOWEX* 2 (OH form), which is sold commercially by The Dow Chemical Company to yield the hydroxide form of said cationic perfluorocarbon.

* Trademark of The Dow Chemical Company

EXAMPLE 2—COATING FORMULATION

A copolymer of about 70 weight percent acrylamide and about 30 weight percent 2-sulfoethyl methacrylate is reacted under basic conditions with the pretreated cationic perfluorocarbon as described in Example 1.

EXAMPLE 3—COATING FORMULATION

An AMPS polymer represented by the formula

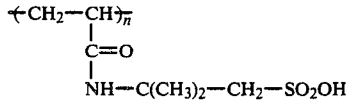

is mixed in a 1:1 mole ratio with pretreated FC 134 as described in Example 1.

EXAMPLE 4—APPLICATION OF THE COATING

Each of the aforementioned coating formulations is applied to steel plates to a coating thickness of approximately 0.1 to about 0.2 mil over the exposed surfaces. The resulting coating is dried in a vacuum oven at 70° C. for 60 minutes or heated at 100° C. for 10 minutes.

EXAMPLE 5—MOLD RELEASE PROPERTIES

After the formulation of Example 1 is applied to the surface as described in Example 4, the following formulation is applied to the surface: 25 g of a polyol, 3 g ethylene glycol, 17.56 g isocyanate and 2 drops of dibutyl tindilaurate. Such a formulation represents a RIM formulation which is commonly molded. The material cured with the release formulation of this invention releases easily from the treated surface even after applying the molding formulation six times. Conversely, the system which is prepared for comparison purposes releases only 2 times when the release system is a standard commercial release system such as that sold commercially as RIM-7 Mold Release by Chem-Trend Incorporated.

EXAMPLE 6—COATING FORMULATION

A coating formulation is prepared as taught in Example 1. Such a system, when applied to a mold, releases high density polyethylene having a melt index of 0.3 and filled with 36 weight percent chopped glass.

What is claimed is:

1. An internal surface of a coated molding apparatus wherein the adherent coating of the surface results from contacting (1) a linear or branched polymer containing a proportion of ionic functional moieties and (2) a proportion of a perfluorocarbon compound having a $-CF_3$ group and a counterionic character, said polymer and said perfluorocarbon compound being present in amounts such that the composition has a critical surface tension of wetting of less than about 15 dynes/cm, in a volatile acidic or basic solution, applying the resulting solution to the surface, and allowing the volatile acidic or basic solution to evaporate.

2. A process for reducing the amount of sticking of material on the internal surface of a molding apparatus used in molding aliphatic and aromatic α-olefin polymers which comprises contacting (1) a linear or branched polymer containing a proportion of ionic functional moieties and (2) a proportion of a perfluorocarbon compound having a $-CF_3$ group and a counterionic character, said polymer and said perfluorocarbon compound being present in amounts such that the composition has a critical surface tension of wetting of less than about 15 dynes/cm, in a volatile acidic or basic solution, applying the resulting solution to said surface, and allowing the volatile acidic or basic solution to evaporate yielding an adherent coating.

* * * * *